[19] 3,771,983
[45] Nov. 13, 1973

[54] METHOD FOR FABRICATION OF PRECISION MINIATURE GLASS CIRCUITS

[75] Inventor: Emil R. Straka, San Jose, Calif.

[73] Assignee: Varian Associates, Palo Alto, Calif.

[22] Filed: June 24, 1971

[21] Appl. No.: 156,211

[52] U.S. Cl............................. 65/31, 65/4, 65/56, 65/DIG. 7, 156/3, 156/15, 156/17, 156/24
[51] Int. Cl............................................. C03c 15/00
[58] Field of Search..................... 65/31, 42, DIG. 7, 65/56, 61; 156/3, 17, 15, 24, 99, 101

[56] References Cited
UNITED STATES PATENTS

| | | | |
|---|---|---|---|
| 3,275,428 | 9/1966 | Siegmund | 156/24 X |
| 3,298,886 | 1/1967 | Vevoda | 156/299 X |
| 3,332,757 | 7/1967 | Hawkins | 65/31 X |
| 3,455,667 | 7/1969 | Snitzer et al. | 65/56 |
| 3,455,668 | 7/1969 | Upton | 65/61 |
| 3,502,455 | 3/1970 | Gardner | 65/61 |

*Primary Examiner*—Robert L. Lindsay, Jr.
*Attorney*—Stanley Z. Cole

[57] ABSTRACT

Precision miniature glass circuits, such as fluidic circuits and optical waveguide and laser circuits, are fabricated by assembling a plurality of glass members of at least two differing types of glass to form a subassembly. The subassembly is heated to fuse the glass members together. The cross sectional dimensions of the assembly may be reduced by drawing. The fused assembly is sliced to obtain a plurality of slabs, each having the two types of glass therein with one of the types of glasses defining a circuit pattern for flow of energy, such as fluid energy or optical energy, therealong. In the case of fluidic circuits, the glass type which defines the circuit pattern is etchable so that it can be removed to provide the fluid flow circuit passageways in the slab. In the case of optical waveguides and circuits, the type of glass defining the circuit pattern has a different index of refraction from the other glass members in order to form light paths or pipes. The slabs containing the circuit patterns are sandwiched between pairs of glass slabs for providing strength and/or for closing off the opposite sides of the energy flow circuit patterns.

3 Claims, 9 Drawing Figures

PATENTED NOV 13 1973    3,771,983

INVENTOR.
EMIL R. STRAKA
BY
ATTORNEY

METHOD FOR FABRICATION OF PRECISION MINIATURE GLASS CIRCUITS

DESCRIPTION OF THE PRIOR ART

Heretofore, it has been proposed to fabricate precision miniature glass circuits, such as fluidic circuits and optical waveguide circuits, by any one of a number of different methods such as machining, photoetching, or diffusion. The problems with these prior methods are that they are either relatively imprecise or are extremely expensive and complex for obtaining circuit dimension tolerances on the order of one-tenth of a micron or less. Such prior art methods for fabricating precision miniature optical circuits of glass are disclosed in the Bell System Technical Journal, Volume 48 of November 7, 1969, in articles titled "Integrated Optics: An Introduction," and "Dielectric Rectangular Waveguide and Directional Coupler For Integrated Optics."

SUMMARY OF THE PRESENT INVENTION

The principal object of the present invention is the provision of an improved method for fabricating precision miniature circuits of glass.

In one feature of the present invention, glass members of at least two different types of glass are positioned to form an assembly which is heated to fuse the different glass members together. The fused assembly is sliced to obtain at least one slab of glass having the two types of glass therein with one of the types of glass defining a circuit pattern for flow of energy therealong, whereby precision miniature circuits of glass are readily fabricated.

In another feature of the present invention, the assembly of glass members of differing types is heated and drawn to reduce the cross sectional dimensions of the assembly to further reduce the size of the resultant glass circuits.

In another feature of the present invention, the one type of glass which defines the circuit pattern in the circuit slab has an index of refraction sufficiently different than the index of refraction of the other type of glass such that the circuit pattern formed in the slab defines an optical waveguide.

In another feature of the present invention, at least one of the assembled types of glass is more readily etchable than the other type of glass and defines a glass circuit pattern in the slab. The etchable glass pattern is suitably removed (e.g., chemical etch, sputter etch, ultrasonic etch) to define a circuit pattern of fluid flow passageways for flow of fluid energy therethrough.

In another feature of the present invention, a glass slab having the circuit pattern defined therein is joined along at least one of its major faces to a second glass slab to improve the strength of the resultant assembly, or to provide appropriate boundary conditions for the conduction of energy.

In another feature of the present invention, a glass slab containing the circuit pattern is joined between a pair of glass slabs to form a wherein: glass sandwich.

Other features and advantages of the present invention will become apparent upon a perusal of the following specification taken in connection with the accompanying drawings, wherein;

DESCRIPTION OF THE PREFERRED EMBODIMENTS

Figure 1:
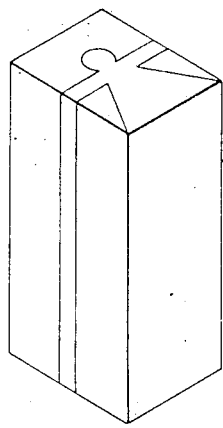
FIG. 1 is a schematic perspective view depicting an assembly of glass members of differing characteristics in the first step in the method for fabricating precision miniature glass circuits according to the present invention.

Referring now to FIGS. 1–5, there is depicted a method of the present invention for fabricating precision miniature fluidic glass circuits. In the first step of the method, which is depicted in FIG. 1, a bundle of glass members are assembled. The glass members are of at least two differing types of glass. For example, in the case for fabrication of fluidic circuits, certain ones of the glass members are made of a glass which is readily chemically etched, such as Schott glass, type LAK—3 commercially available from the Schott Glass Company of Duryea, Pennsylvania. This chemically unstable glass is arranged in a certain predetermined pattern within the bundle of glass such that a cross section through the bundle will show the chemically etchable glass arranged in a pattern conforming to the fluidic circuit pattern to be formed. The remainder of the bundle is made of a second type of glass which is chemically more inert. An example of such chemically inert glass includes glass sold under the trademark Pyrex by Corning Glass Works, Corning, New York. One suitable glass utilizable with Schott glass is Corning glass No. 8161. The first and second types of glass should have similar thermal expansion characteristics, and the second type glass should have a higher viscosity than the first type in the temperature range at which they will be worked, as by drawing. For example, a difference in softening temperatures of 100°C is appropriate.

The bundle of glass 1 is assembled within a suitable mold (e.g., carbon) and held therein to retain the proper shape. The individual glass members have preformed desired cross sectional shapes obtained for example by prior drawing. The carbon mold is then inserted into a furnace preferably having an inert nitrogen atmosphere and raised to a sufficient temperature to fuse or tack the various glass members of the bundle together to form a rigid fused bundle. Typically, tacking occurs at a temperature of approximately 100°C below the softening point of the glasses.

Figure 2:
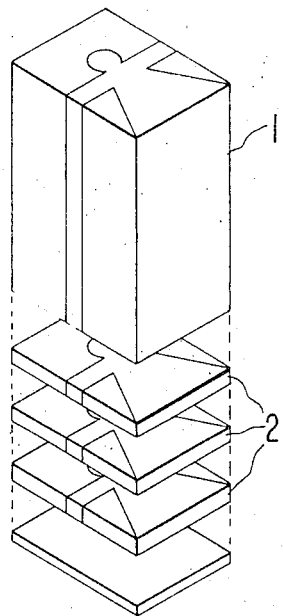
FIG. 2 is a schematic perspective view of the assembly of FIG. 1 depicting a slicing operation wherein the fused assembly is sliced into individual glass slabs according to another step in the method of the present invention.
Figure 3:
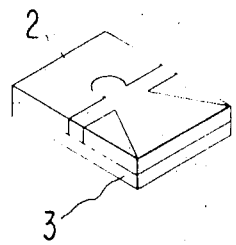
FIG. 3 is a schematic perspective view of a slab containing a glass circuit joined to a supporting slab of glass in accordance with another step in the method of the present invention.

In the third step of the method, the fused bundle of glass, as shown in FIG. 2, is removed from the mold and sliced into slabs by means of a suitable saw such as a wire saw or band saw, to form individual slabs 2. Each slab 2 contains the pattern of unstable glass which is to define the fluidic circuit.

In the fourth step of the method, the major faces of the individual glass slabs 2 are lapped and polished and one is placed in intimate contact over a second slab 3 of glass of a type corresponding to the stable glass type. The sub-assembly is then inserted into a furnace and heated to a temperature slightly above the tacking temperature and slightly below the softening point to fuse the circuit slab 2 to the supporting slab 3.

Figure 4:
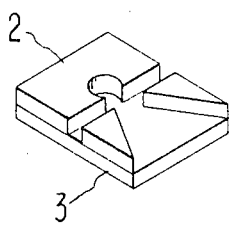
FIG. 4 is an enlarged perspective view of the structure of FIG. 3 after appropriately removing the glass circuit pattern formed by the unstable glass according to another step in the method of the present invention.

In the fifth step of the method, as shown in FIG. 4, the unstable glass is etched away to form the sub-assembly of FIG. 4 by immersing the sub-assembly in a suitable etchant, such as hydrochloric, nitric, or acetic acid. Etching is continued until the unstable glass has been removed.

Figure 5:
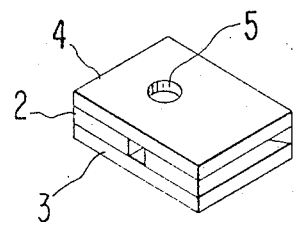
FIG. 5 is an enlarged perspective view of the structure of FIG. 4 including a second slab of glass joined to the top of the assembly of FIG. 4 to define a fluidic circuit.

In the sixth step of the method, as shown in FIG. 5, a second slab of stable glass 4 is fused over the top of the etched fluidic circuit in the manner as previously described above with regard to the fourth step of the method. A port 5 may also be provided in the cover plate 4 to provide a signal or gating input of flow of fluid to the fluidic amplifier circuit.

As an alternative to the method previously described with regards to FIGS. 1–5, a more intricate glass circuit and/or additional stages of fluidic amplifier circuits may be constructed by drawing the assembly of FIG. 1 in a furnace to substantially reduce the cross sectional dimensions of the circuit pattern and to produce a corresponding increase in the length of the bundle. Several bundles may then be assembled in the proper relationship to define a multiple stage fluidic amplifier circuit. The multiple stage fluidic amplifier circuit bundle is then fused in the same manner as previously described with regard to FIG. 1 and the fused or fused and drawn composite assembly is then sliced and fused to plates as previously described with regard to FIGS. 2–5 to provide a composite fluidic amplifier circuit. In each drawing step the cross sectional dimensions may be reduced by a factor of 10 to 20.

Figure 6:
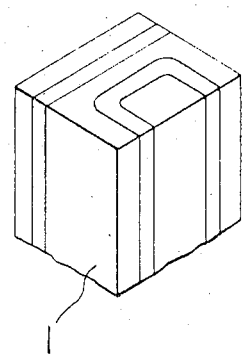
FIG. 6 is a view similar to that of FIG. 1 depicting a similar step for forming an optical circuit of glass.
Figure 7:
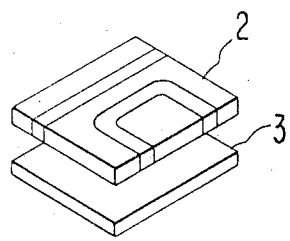
FIG. 7 is a view similar to that of FIG. 2 depicting a slicing step in the method for fabricating an optical circuit.
Figure 8:
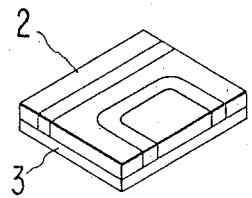
FIG. 8 is a view similar to that of FIG. 3 depicting joining the glass circuit slab to a substrate slab.

Referring now to FIGS. 6–9, there is shown a method substantially the same as that previously described with regard to FIGS. 1–5, for fabricating precision miniature optical waveguide circuits or laser circuits, and, in particular, an optical directional coupler. More particularly, in the first step of the method, as shown in FIG. 6, a bundle of glass members is assembled of two types of glass having different indices of refraction and viscosities but similar light attenuation properties and coefficients of thermal expansion. For example, those glass members which are to form the optical waveguide circuit are formed of a glass having an index of refraction between 0.01 and 0.05 greater than the index of refraction of the glass which is to form the body or noncircuit portions of the directional coupler. For example, a suitable glass which is to form the optical waveguide circuit is Schott LAK—3, commercially available from Schott Glass Company of Duryea, Pennsylvania, such glass having an index of refraction of 1.693, whereas the glass forming the body portion may comprise Corning Glass No. 8161 having an index of refraction of 1.659 and is commercially available from Corning Glass Works of Corning, New York.

In the second step, the glass members are fused, or fused and drawn in a drawing furnace. In a typical example, the drawing furnace may have a feed rate of $x$ and the bundle may be drawn out of the furnace at a draw rate of 10 to 20 times $x$ to produce a substantial reduction in the cross sectional dimensions of the bundle being drawn. As previously mentioned above, the drawn members may then be assembled into another assembly and fused or drawn a second time to produce even smaller and more intricate circuits.

The fused bundle of glass members is sliced on a wire saw or band saw, as aforedescribed, to produce individual glass slabs 2 containing the optical circuit pattern therein of the glass of higher index of refraction. The slabs 2 are then lapped and polished by standard procedures to an appropriate thickness, 0.010 to 0.015 inch with an optical lapping compound and polished with 1 micron cerium oxide. The lapped and polished slabs 2 are fused to a supporting glass slab 3 which may be chosen for certain special properties or it may be the same glass as that of the body of the slab 2 which contains the circuits.

In the next step, additional polishing of the topside of the fused slab 2 and support 3 is obtained to allow the original circuit slab layer 2 to be polished to an overall thickness corresponding to a desired optical waveguide height or thickness. Typical waveguide heights obtainable by this method range down to 0.5 micron, which is suitable for visible light.

Figure 9:
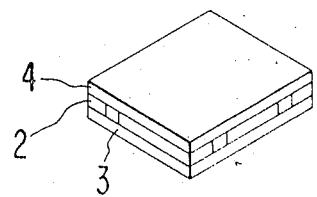
FIG. 9 is a view similar to that of FIG. 5 depicting the last step in the method of forming the optical circuit wherein a second glass slab is joined to the top of the circuit.

In the final step of the method, as shown in FIG. 9, an additional slab of glass 4 is fused over the polished top surface of the optical waveguide circuit to provide a sandwich of glass which includes the directional coupler circuit.

A variety of other optical devices which may be fabricated according to the method of FIGS. 6–9 include directional coupler hybrid resonators, straight channel dropping filters, junction hybrids, ring and pill box channel dropping filters, and with the use of diffusion and ion implantation mentioned in the aforecited Bell System Technical Journal, phase and amplitude modulators, detectors, light sources and amplifiers.

The advantage of the method of the present invention for fabricating precision miniature glass circuits, such as fluidic or optical circuits, is that the circuits may be readily fabricated with extremely close tolerances, such as one-tenth of a micron or less. Drawing the glass bundles allows the circuit proportions to be determined with relatively large glass members. These proportions are retained while the scale of the circuit is reduced by drawing to extremely small dimensions, as aforedescribed.

As used herein "glass" is defined as including glass like materials such as glassy systems, fused quartz, and ferro-electric glass ceramic systems such as those disclosed in an article by N.F. Borrelli et al., appearing in The Proceedings of the Toledo Award Symposium of The American Ceramic Society, January 18, 1971.

In the case of fluidic circuits, the etchable glass need only be substantially more rapidly etchable than the other glass. Suitable etching methods include chemical etching, sputter etching and ultrasonic etching.

In the case where a circuit slab portion is joined to a supporting or cover slab, the slabs need not be joined by fusing, but may be joined by a suitable adhesive. In the case of an optical circuit, an optical cement having the appropriate index of refraction would be employed. Alternatively, a fluid layer, as of gas or liquid, of proper index of refraction could join the circuit slab to the supporting slab.

In the aforedescribed optical waveguide embodiments, other suitable combinations of glasses include Schott Glass No. SK—19, which would be used for the light path while BaLF—4 is suitable as the body portion of the composite glass structure.

What is claimed is:

1. A method for fabricating circuit devices of glass comprising the steps of:

positioning at least three elongated glass members of uniform cross section together such that one of said members is positioned intermediate the other two and said members are oriented in a given direction, the intermediate one of said members having a different etch resistance than the other two of said members, heating said members to fuse them together to form a first assembly, the shapes of said members being such that in a cross-sectional view of the fused assembly, the boundaries of said intermediate member with said other two members define a circuit path perpendicular to said given direction, slicing a cross-sectional portion from said first assembly to obtain a first slab having two major faces, joining one of the major faces of said first slab to a bottom glass slab to form a second assembly, subjecting said second assembly to an etchant which will remove only said intermediate member, joining the remaining, exposed major face of said first slab to a top glass slab such that said bottom and top slabs sandwich said second and third glass members and such that the void left by the removal of said intermediate glass member provides a circuit path bounded by said other two glass members and said bottom and top slabs.

2. The method of claim 1, further including the step of drawing said first assembly of glass members to reduce the corss-sectional dimensions thereof prior to slicing said first assembly.

3. The method of claim 2, further including the step of polishing said cross-sectional slab after it is sliced from said first assembly.

* * * * *